US011880489B2

(12) United States Patent
Tanaka et al.

(10) Patent No.: US 11,880,489 B2
(45) Date of Patent: Jan. 23, 2024

(54) SECRET STATISTICAL PROCESSING SYSTEMS, METHODS, STATISTICAL PROCESSING APPARATUS AND PROGRAM

(71) Applicant: NIPPON TELEGRAPH AND TELEPHONE CORPORATION, Tokyo (JP)

(72) Inventors: Satoshi Tanaka, Musashino (JP); Asami Miyajima, Musashino (JP); Gen Takahashi, Musashino (JP); Dai Ikarashi, Musashino (JP); Koki Hamada, Musashino (JP); Ryo Kikuchi, Musashino (JP); Hitoshi Fuji, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 385 days.

(21) Appl. No.: 17/274,187

(22) PCT Filed: Aug. 28, 2019

(86) PCT No.: PCT/JP2019/033606
§ 371 (c)(1),
(2) Date: Mar. 8, 2021

(87) PCT Pub. No.: WO2020/054403
PCT Pub. Date: Mar. 19, 2020

(65) Prior Publication Data
US 2021/0342476 A1 Nov. 4, 2021

(30) Foreign Application Priority Data
Sep. 10, 2018 (JP) ................................. 2018-168573

(51) Int. Cl.
G06F 21/62 (2013.01)
G09C 1/00 (2006.01)
G06N 7/01 (2023.01)

(52) U.S. Cl.
CPC .......... *G06F 21/6245* (2013.01); *G06N 7/01* (2023.01); *G09C 1/00* (2013.01)

(58) Field of Classification Search
CPC ........ G06F 21/6245; G06N 7/01; G09C 1/00; H04L 2209/46
(Continued)

(56) References Cited

U.S. PATENT DOCUMENTS

2018/0139045 A1* 5/2018 Furukawa ............... H04L 9/085
2018/0366227 A1* 12/2018 Kawamoto ............ G16H 50/20

FOREIGN PATENT DOCUMENTS

WO 2016/178291 A1 11/2016
WO 2017/119211 A1 7/2017

OTHER PUBLICATIONS

Chida et al., "A Three-Party Secure Function Evaluation with Lightweight Verifiability Revisited", 2010, 13 pages including English Translation.
(Continued)

Primary Examiner — Jeffrey C Pwu
Assistant Examiner — Nega Woldemariam
(74) Attorney, Agent, or Firm — XSENSUS LLP

(57) ABSTRACT

Provided is a technique for performing statistical processing such as processing for obtaining parameters of logistic regression analysis faster than before. A secure statistical processing system includes a cross tabulation table computing device 2 that performs secure computation on a cross tabulation table in which frequencies are in plain texts while keeping each record concealed; and a statistical processing device 3 that performs predetermined statistical processing (Continued)

using the cross tabulation table in which frequencies are in plain texts. The cross tabulation table computing device 2 may include a plurality of secure computation devices 221, ..., 22N that perform secure computation on a cross tabulation table in which frequencies are fragments subjected to secret sharing while keeping each record concealed, and a management device 21 that restores the fragments to compute the cross tabulation table in which frequencies are in plain texts.

11 Claims, 3 Drawing Sheets

(58) Field of Classification Search
USPC .............................................................. 726/2
See application file for complete search history.

(56) References Cited

OTHER PUBLICATIONS

Bishop, "Pattern Recognition and Machine Learning, vol. 1", Bayesian Statistical Prediction, Maruzen Publishing, Apr. 5, 2012, pp. 204-206 (13 pages including English Translation).
"Started Trial Provision of Secret Calculation System 'Calculator'—Realize a World Where Important Data can be Used Safely and Securely", Business Communication, vol. 55, No. 9, 2018, pp. 50-51, (7 pages including English Translation).

* cited by examiner

Fig. 3

| $x_1 \backslash x_2$ | $y = 0$ | | | | $y = 1$ | | |
|---|---|---|---|---|---|---|---|
| | $b_1$ | ... | $b_{l_2}$ | | $b_1$ | ... | $b_{l_2}$ |
| $a_1$ | $m_{1,1}$ | ... | $m_{1,l_2}$ | | $m_{1,1}$ | ... | $m_{1,l_2}$ |
| ... | | | ... | | | | |
| $a_{l_1}$ | $m_{l_1,1}$ | ... | $m_{l_1,l_2}$ | | $m_{l_1,1}$ | ... | $m_{l_1,l_2}$ |

SECRET STATISTICAL PROCESSING SYSTEMS, METHODS, STATISTICAL PROCESSING APPARATUS AND PROGRAM

CROSS-REFERENCE TO RELATED APPLICATIONS

The present application is based on PCT filing PCT/JP2019/033606, filed Aug. 28, 2019, which claims priority to JP 2018-168573, filed Sep. 10, 2018, the entire contents of each are incorporated herein by reference.

TECHNICAL FIELD

The present invention relates to a cryptographic application technique, and more particularly to a secure computation technique that performs data processing without revealing input data.

BACKGROUND ART

There is a method called secure computation as a method for obtaining a specific computation result without restoring encrypted numerical values (e.g., see NPL 1). The secure computation encrypts a numerical value by dispersing fragments of the numerical value to three or more number of secure computation devices so that addition/subtraction, constant multiplication, multiplication, logical operation, and data format conversion can be performed on the numeral value without restoring them to the original numerical value. Further, the secure computation makes it possible to keep these computation results encrypted, that is, the fragments dispersed. Furthermore, as an extension of such a secure computation, there are known secure sorting that performs sorting a plurality of pieces of data while concealing them, and a method of expressing floating point numbers by the fragments used in the secure computation so that arithmetic operations such as four arithmetic operations and exponential functions are performed on the fragments.

CITATION LIST

Non Patent Literature

[NPL 1] Koji Senda, Hiroki Hamada, Dai Igarashi, and Katsumi Takahashi, "Reconsideration of Lightweight Verifiable Three-Party Secure Function Computation", InCSS, 2010

[NPL 2] C. M. Bishop (author), Hiroshi Motoda (translation supervisor), Takio Kurita (translation supervisor), Tomoyuki Higuchi (translation supervisor), Yuji Matsumoto (translation supervisor), and Noboru Murata (translation supervisor), "Pattern Recognition and Machine Learning 1st vol.", 2012, pp. 204-206

SUMMARY OF THE INVENTION

Technical Problem

Incidentally, in order to perform statistical processing such as processing for obtaining parameters of logistic regression analysis on a cross tabulation table, operations such as division and exponential function are required (e.g., see NPL 2).

However, such operations, which are performed by secure computation in the existing methods, are slow, and in some cases, they cannot be completed within a practical time frame.

An object of the present invention is to provide a secure statistical processing system, a method, a statistical processing device, and a program for performing statistical processing such as processing for obtaining parameters of logistic regression analysis faster than before.

Means for Solving the Problem

A secure statistical processing system according to one aspect of the present invention includes a cross tabulation table computing device that performs secure computation on a cross tabulation table in which frequencies are in plain texts while keeping each record concealed; and a statistical processing device that performs predetermined statistical processing using the cross tabulation table in which frequencies are in plain texts.

Effects of the Invention

It is possible to perform statistical processing such as processing for obtaining parameters of logistic regression analysis faster than before.

BRIEF DESCRIPTION OF DRAWINGS

FIG. 3 illustrates an example of a cross tabulation table.

DESCRIPTION OF EMBODIMENTS

Figure 1:
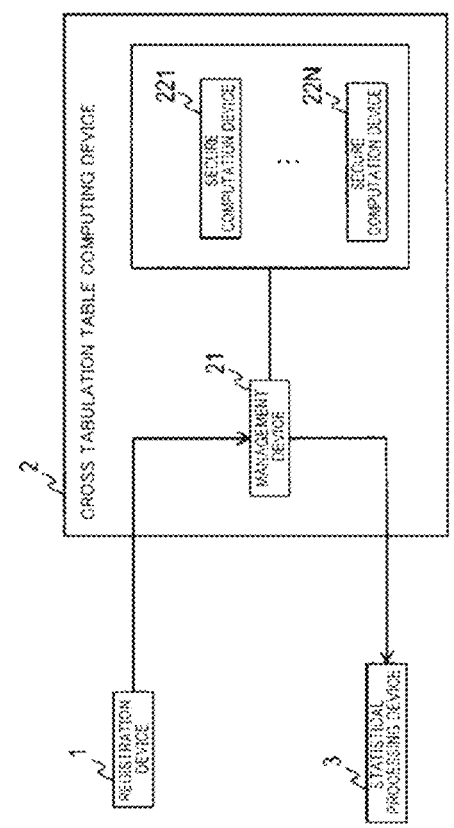
FIG. 1 is a diagram illustrating an example of a functional configuration of a secure statistical processing system.

Embodiments of the present invention will be described below in detail. Note that in the drawings, components having the same function are denoted by the same reference numerals, and duplicate description will be omitted.

Technical Background

For statistical processing such as processing for obtaining parameters of a logistic regression analysis using a cross tabulation table, secure computation may result in slow performance as it is used for all computations necessary for the statistical processing such as processing for obtaining parameters of a logistic regression analysis. This is because, for example, the statistical processing such as processing for obtaining parameters of a logistic regression analysis may include operations, such as divisions or exponential functions, which result in slow performance as the secure computation is used.

Here, the cross tabulation table is a table in which frequencies of respective combinations of attribute values are collected for a plurality of category attributes. In other words, the cross tabulation table is a table in which frequencies corresponding to the respective combinations (x, y) of attribute values are collected. For example, if an explanatory variable has two attributes ($x_1$, $x_2$) and an objective variable has one attribute y for the sake of simplification of description, a cross tabulation table for these three attributes ($x_1 \times x_2 \times y$) is as illustrated in FIG. 3.

In FIG. 3, $a_1, \ldots, a_{l1}$ are attribute values of attribute $x_1$, and $l_1$ is the number of attribute values of attribute $x_1$. Here, l1, which is the subscript of $a_{l1}$, refers to "$l_1$" Thus, in a subscript, the representation of further superscript and subscript in the subscript is sometimes omitted. Similarly, in a superscript, the representation of further superscript and subscript in the superscript is sometimes omitted. Further, $a_1, \ldots, a_{l_2}$ is attribute values of attribute $x_2$, and $l_2$ is the number of attribute values of attribute $x_2$. Further, $n_{i,j}$ is a frequency for the attribute value of attribute $x_1$ being $a_i$, the attribute value of attribute $x_2$ being $b_j$, and the attribute value of attribute y being 0. Further, $m_{i,j}$ is a frequency for the attribute value of attribute $x_1$ being $a_i$, the attribute value of attribute $x_2$ being $b_j$, and the attribute value of attribute y being 1.

Here, after the cross tabulation table is obtained, normal computation, which is not secure computation, can be used for processing required for the statistical processing such as a logistic analysis including divisions and exponential functions, on the basis of the frequencies in the obtained cross tabulation table. Thus, in the present invention, after the cross tabulation table is obtained, normal computation, which is not secure computation, is used for operations, such as divisions and exponential functions, that result in slow performance as secure computation is used on the basis of the frequencies in the obtained cross tabulation table. As a result, it is possible to perform statistical processing such as processing for obtaining parameters of logistic regression analysis faster than before.

Embodiment

As illustrated in FIG. 1, a secure statistical processing system includes, for example, a cross tabulation table computing device 2 and a statistical processing device 3. The secure statistical processing system may further include one or more registration devices 1.

Figure 2:
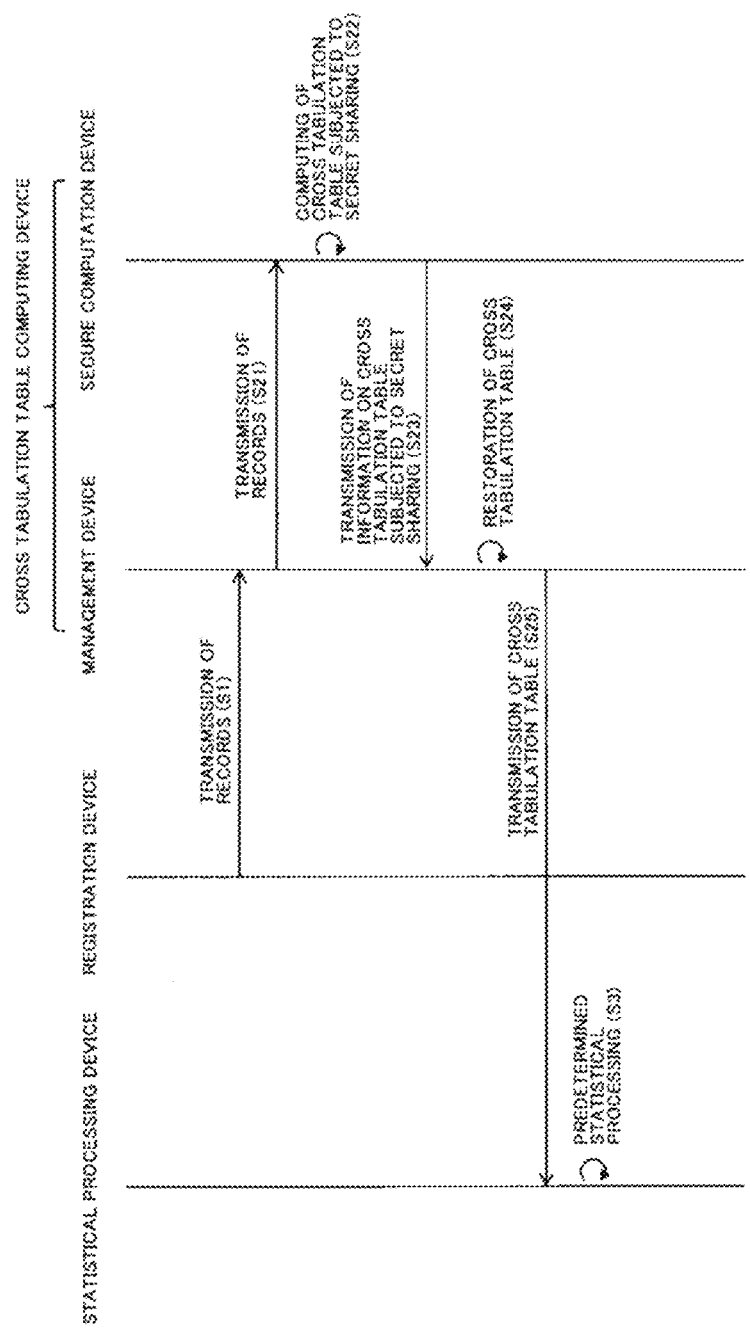
FIG. 2 illustrates an example of a processing procedure of a secure statistical processing method.

A secure statistical processing method is implemented, for example, by the secure statistical processing system performing processing of steps S1 to S3 described below and illustrated in FIG. 2.

Registration Device 1

Each registration device 1 holds records necessary for the secure statistical processing system to generate a cross tabulation table. For example, the registration device 1 is a computer that holds information on each individual, such as a health insurance association and a company. In this case, a record necessary for generating the cross tabulation table is information related to health such as height, weight, and blood pressure of each individual.

Each registration device 1 transmits pieces of information on the respective records necessary for generating the cross tabulation table to the cross tabulation table computing device 2. For example, each registration device 1 conceals each record by secret sharing so as to generate N fragments. Each registration device transmits the N fragments to the cross tabulation table computing device 2 as information necessary for generating the cross tabulation table.

Cross Tabulation Table Computing Device 2

The information on each record necessary for generating the cross tabulation table is input to the cross tabulation table computing device 2. Here, that information is transmitted from each registration device 1.

The cross tabulation table computing device 2 performs secure computation on the cross tabulation table in which frequencies are in plain texts while keeping each record concealed (step S2).

The cross tabulation table in which frequencies are plain texts is transmitted to the statistical processing device 3.

The cross tabulation table computing device 2 includes, for example, a management device 21 and N secure computation devices 221, ..., 22N. Here, N is a predetermined positive integer of 2 or more. Hereinafter, processing in the cross tabulation table computing device 2 in this case will be described.

The information on each record necessary for generating the cross tabulation table is transmitted from each registration device 1 and input to the management device 21.

The management device 21 transmits the above-mentioned information on each input record to the secure computation devices 221, ..., 22N (step S21). For example, when the input information on each record is N fragments subjected to secret sharing, the management device 21 transmits the N fragments to the respective secure computation devices 221, ..., 22N.

The secure computation devices 221, ..., 22N each perform secure computation on the cross tabulation tables in which frequencies are fragments subjected to secret sharing while keeping each record concealed (step S22). In other words, the secure computation devices 221, ..., 22N perform secure computation on the cross tabulation table in which frequencies are fragments subjected to secret sharing without restoring the N fragments subjected to secret sharing (e.g., see Reference 1).

[Reference 1] Dai Igarashi, Koji Senda, Hiroki Hamada, and Katsumi Takahashi, "Efficiency of Lightweight Verifiable Three-Party Secure Function Computation and Secure Database Processing using the same", 2011 Cryptography and Information Security Symposium The secure computation devices 221, ..., 22N each transmit the cross tabulation table in which frequencies are fragments subjected to secret sharing to the management device 21 (step S23).

The management device 21 restores the fragments, in other words, restores the fragmented frequencies of the cross tabulation table, thereby computing the cross tabulation table in which frequencies are in plain texts (step S24).

The management device 21 transmits the computed cross tabulation table to the statistical processing device 3 (step S25).

Statistical Processing Device 3

To the statistical processing device 3, the cross tabulation table in which frequencies are in plain texts transmitted from the cross tabulation table computing device 2 is input.

The statistical processing device 3 performs predetermined statistical processing using the cross tabulation table in which frequencies are in plain texts (step S3). The predetermined statistical processing by the statistical processing device 3 is performed using plain texts, not secure computation.

The predetermined statistical processing is processing including operations such as divisions and exponential functions, which result in slow performance for secure computation. An example of the predetermined statistical processing is processing of calculating parameters of logistic regression analysis.

Hereinafter, an example of the processing of the statistical processing device 3 will be described in a case where the predetermined statistical processing is processing of calculating parameters of logistic regression analysis for the cross tabulation table for three attributes $(x_1, x_2, y)$ of FIG. 3.

To obtain the parameters of logistic regression analysis for the cross tabulation table for three attributes ($x_1$, $x_2$, y) of FIG. 3, an error function $E(\vec{w})$ of this cross tabulation table:

$$E(\vec{w}) = -\sum_{i=1}^{t_1} \sum_{j=1}^{t_2} \left\{ \log\binom{n_{i,j}+m_{i,j}}{m_{i,j}} + (\vec{w}^T \vec{x}_{i,j})m_{i,j} - (m_{i,j}+n_{i,j})\log(1+e^{\vec{w}^T \vec{x}_{i,j}}) \right\}$$ [Formula 1]

is maximized. Here, suppose that the parameters of logistic regression analysis are $w_0$, $w_1$, and $w_2$, $\vec{w}=(w_0, w_1, w_2)$, $\vec{x}_{i,j}=(1, a_i, b_j)$, T is the transpose of a vector or matrix, $$\vec{w}^T \vec{x}_{i,j} := w_0 + w_1 a_i + w_2 b_j$$ [Formula 2]

is established.

Partial differentiation of the error function $E(\vec{w})$ with respect to $w_0$, $w_1$, and $w_2$ yields the following equations:

$$\frac{\partial E(\vec{w})}{\partial w_0} = \sum_{i=1}^{t_1} \sum_{j=1}^{t_2} \left\{ (m_{i,j}+n_{i,j}) \cdot \frac{1}{1+e^{-\vec{w}^T \vec{x}_{i,j}}} - m_{i,j} \right\}$$ [Formula 3]

$$\frac{\partial E(\vec{w})}{\partial w_1} = \sum_{i=1}^{t_1} \sum_{j=1}^{t_2} \left\{ (m_{i,j}+n_{i,j}) \cdot \frac{a_i}{1+e^{-\vec{w}^T \vec{x}_{i,j}}} - m_{i,j} a_i \right\}$$

$$\frac{\partial E(\vec{w})}{\partial w_2} = \sum_{i=1}^{t_1} \sum_{j=1}^{t_2} \left\{ (m_{i,j}+n_{i,j}) \cdot \frac{b_j}{1+e^{-\vec{w}^T \vec{x}_{i,j}}} - m_{i,j} b_j \right\}$$

Since the following is established:

$$\vec{w}^T \vec{x}_{i,j} := w_0 + w_1 a_i + w_2 b_j$$ [Formula 4]

, the values of these partially differentiated expressions can be calculated from the cross tabulation table in which frequencies are in plain texts. The statistical processing device 3 obtains parameters $w_0$, $w_1$, and $w_2$ of the logistic regression analysis such that the values of these partially differentiated expressions are sufficiently close to 0.

Therefore, the statistical processing device 3 performs the following processing with d being a predetermined integer of 1 or more. For a cross tabulation table for three attributes ($x_1$, $x_2$, y), d is 2.

The statistical processing device 3 sets a parameter $\alpha$ to a predetermined value (step S31). The parameter $\alpha$ is, for example, is set to a value less than 1 and sufficiently close to 0. In other words, it is set such that $0<\alpha\ll 1$.

The statistical processing device 3 sets $\vec{w}^{(0)}=(w_0^{(0)}, w_1^{(0)}, \ldots, w_d^{(0)})$ to predetermined values (step S32). Further, the statistical processing device 3 sets t to 0. The predetermined values are, for example, random values.

The statistical processing device 3 calculates, from the cross tabulation table in which frequencies are in plain texts, a gradient $\mathrm{grad}(E(\vec{w}^{(t)}))=(\partial E(\vec{w}^{(t)})/\partial w_0^{(t)}, \partial E(\vec{w}^{(t)})/\partial w_1^{(t)}, \ldots, \partial E(\vec{w}^{(t)})/\partial w_d^{(t)})$ (step S33).

If the value of the gradient $\mathrm{grad}(E(\vec{w}^{(t)}))$ satisfies a predetermined end condition, the statistical processing device 3 ends the processing (step S34). Here, $\vec{w}^{(t)}=(w_0^{(t)}, w_1^{(t)}, \ldots, w_d^{(t)})$ at the end of the processing becomes the parameters of the logistic regression analysis. The predetermined end condition is, for example, $\|\mathrm{grad}(E(\vec{w}^{(t)}))\|<\varepsilon$, where $\varepsilon$ is a predetermined positive value. Here, $\varepsilon$ is a positive value close to 0, for example. The predetermined end condition may be $\|\mathrm{grad}(E(\vec{w}^{(t)}))\|<\varepsilon|E(\vec{w}^{(t)})|$ or $\|\mathrm{grad}(E(\vec{w}^{(t)}))\|<\varepsilon(1+|E(\vec{w}^{(t)})|)$. Here, $|x|$ is the absolute value of x, and $\|v\|$ is the L2 norm $((v^T v)^{(1/2)})$ of the vector v.

If the value of the gradient $\mathrm{grad}(E(\vec{w}^{(t)}))$ does not satisfy the predetermined end condition, the statistical processing device 3 calculates $\vec{w}^{(t+1)}=\vec{w}^{(t)}-\alpha \cdot \mathrm{grad}(E(\vec{w}^{(t)}))$ (step S35).

The statistical processing device 3 sets t=t+1, in other words, increments t by 1, and the processing returns to step S33. As a result, the processing from step S33 to step S35 is repeated until the value of the gradient $\mathrm{grad}(E(\vec{w}^{(t)}))$ satisfies the predetermined end condition.

In this way, the secure statistical processing system according to the present invention uses a cross tabulation table to execute divisions and exponential functions, which result in slow performance for secure computation, with a normal algorithm not using secure computation while protecting the privacy of individual records, thereby making it possible to obtain the parameters of logistic regression analysis within a practical timeframe.

Modified Example

The above description is for the embodiments of the present invention. Needless to say, the specific configuration is not limited to these embodiments, and the present invention encompasses those, even if the design and the like are changed as appropriate, without departing from the spirit of the present invention.

For example, each registration device 1 may transmit, to the cross tabulation table computing device 2, information obtained by randomly exchanging records necessary for generating a cross tabulation table, as information necessary for generating the cross tabulation table.

In this case, the cross tabulation table computing device computes a cross tabulation table in which frequencies are in plain texts based on the randomly exchanged records (step S2). In this case, since the records are randomly exchanged, each record is concealed from the cross tabulation table computing device 2.

Further, the various of steps of processing described in the embodiments are not only performed in time series according to the order described, but also may be performed in parallel or individually according to the processing capability of the device that performs the steps of processing or as needed.

Program and Recording Medium

When various processing functions of each device described above are implemented by a computer, the processing contents of the functions to be installed in each device are described by a program. Then, this program is executed on the computer to implement the various processing functions of each device on the computer.

The program describing the processing contents can be recorded in a computer-readable recording medium. The computer-readable recording medium may be any type, for example, a magnetic recording device, an optical disc, a magneto-optical recording medium, or a semiconductor memory.

Further, the distribution of this program is performed by, for example, selling, transferring, or lending a portable recording medium such as a DVD or a CD-ROM in which the program is recorded. Furthermore, the program may be stored in a storage device of a server computer and transferred from the server computer to another computer via a network to distribute the program.

A computer that executes such a program temporarily stores, for example, the program recorded on a portable recording medium or the program transferred from the server computer in its own storage device. Then, when executing the processing, this computer reads the program stored in its own storage device, and executes the processing according to the read program. Further, as another execution form of this program, a computer may directly read the program from a portable recording medium, and execute the processing according to the program, and each time the program is transferred from the server computer to the computer, the processing according to the received program may be sequentially executed. Further, the above-described processing may be executed by a so-called ASP (Application Service Provider) type service that implements the processing functions only by an execution instruction and the acquisition of its result without transferring the program from the server computer to the computer. Note that the program in this form includes information that is used for an electronic computer processing it and that is equivalent to the program (data that is not a direct command to the computer, but has the property of defining computer processing).

Further, in this form, the present device is implemented by executing the predetermined program on the computer, but at least a part of the processing content may be implemented by hardware.

REFERENCE SIGNS LIST

1 Registration device
2 Cross tabulation table computing device
21 Management device
221, . . . , 22N Secure computation device
3 Statistical processing device

The invention claimed is:

1. A secure statistical processing system, comprising:
cross tabulation table computing circuitry configured to perform secure computation on a cross tabulation table in which each record is concealed and frequencies of each record having a predetermined value are in plain text; and
statistical processing circuitry configured to perform predetermined statistical processing using the cross tabulation table in which frequencies are in plain texts,
wherein the statistical processing circuitry performs processing of calculating parameters of logistic regression analysis, and
the cross tabulation table computing circuitry includes:
a plurality of secure computation circuitries that performs secure computation on a cross tabulation table in which frequencies are fragments subjected to secret sharing while keeping each record concealed, and
management circuitry that restores the fragments to compute the cross tabulation table in which frequencies are in plain texts, wherein
the plurality of secure computation circuitries randomly exchange records in performing the secure computation,
the plurality of secure computation circuitries perform the secure computation in parallel, and
the plurality of computation circuitries calculate the parameters of the logistic regression analysis by maximizing an error function whose arguments are the parameters.

2. The statistical processing circuitry of the secure statistical processing system according to claim 1.

3. A secure statistical processing method, comprising:
by cross tabulation table computing circuitry, performing secure computation on a cross tabulation table in which each record is concealed and frequencies of each record having a predetermined value are in plain text; and
by statistical processing circuitry, performing predetermined statistical processing using the cross tabulation table in which frequencies are in plain texts, including calculating parameters of logistic regression analysis, wherein
the method further includes:
performing, by a plurality of secure computation circuitries, secure computation on a cross tabulation table in which frequencies are fragments subjected to secret sharing while keeping each record concealed, and
restoring the fragments to compute the cross tabulation table in which frequencies are in plain texts, wherein
the plurality of secure computation circuitries randomly exchange records in performing the secure computation,
the plurality of secure computation circuitries perform the secure computation in parallel, and
the plurality of computation circuitries calculate the parameters of the logistic regression analysis by maximizing an error function whose arguments are the parameters.

4. A non-transitory computer-readable medium storing a program, that, when executed by a computer, causes the computer to perform a method according to claim 3.

5. The statistical processing system according to claim 1, wherein the predetermined statistical processing performed by the processing circuitry is unsecured statistical processing.

6. The statistical processing system according to claim 5, wherein the records include health insurance information.

7. The statistical processing system according to claim 6, wherein the health insurance information includes height, weight, and blood pressure information.

8. The statistical processing system according to claim 7, wherein the predetermined statistical processing included divisions and exponential functions.

9. The statistical processing system according to claim 1, wherein in calculation the parameters of the logistic regression analysis by maximizing the error function, the plurality of computation circuitries partially differentiate the error function.

10. The statistical processing system according to claim 9, wherein the plurality of computation circuitries partially differentiate the error function with respect to the parameters to generate a set of partial derivative functions.

11. The statistical processing system according to claim 10, wherein the plurality of computation circuitries calculate the parameters such that the set of partial derivative functions are substantially zero.

* * * * *